United States Patent
Yamamoto et al.

(10) Patent No.: US 7,572,528 B2
(45) Date of Patent: Aug. 11, 2009

(54) MAGNETIC RECORDING MEDIUM, METHOD OF MANUFACTURING THE SAME, AND MAGNETIC RECORDING/REPRODUCTION APPARATUS

(75) Inventors: Takayuki Yamamoto, Ome (JP); Masatoshi Sakurai, Tokyo (JP); Yoshiyuki Kamata, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 630 days.

(21) Appl. No.: 11/135,258

(22) Filed: May 24, 2005

(65) Prior Publication Data

US 2005/0282038 A1    Dec. 22, 2005

(30) Foreign Application Priority Data

Jun. 22, 2004 (JP) .............................. 2004-183933

(51) Int. Cl.
*G11B 5/66* (2006.01)
*G11B 5/82* (2006.01)
*G11B 23/03* (2006.01)

(52) U.S. Cl. ............... 428/833.2; 428/833.1; 360/135

(58) Field of Classification Search ............. 428/848, 428/848.5, 336, 833.2, 831, 848.1, 835, 833, 428/825, 825.1, 900, 833.1; 204/192.1, 192.16; 360/135; 427/131
See application file for complete search history.

(56) References Cited

U.S. PATENT DOCUMENTS

| 4,647,494 A | 3/1987 | Meyerson et al. |
| 4,701,374 A * | 10/1987 | Sagoi et al. .................. 428/336 |
| 4,935,278 A * | 6/1990 | Krounbi et al. ............ 428/848.5 |
| 5,766,718 A * | 6/1998 | Matsuda et al. .......... 428/848.5 |
| 6,168,845 B1 | 1/2001 | Fontana, Jr. et al. |
| 6,365,012 B1 * | 4/2002 | Sato et al. ............... 204/192.16 |
| 6,689,495 B1 * | 2/2004 | Sato et al. .................... 428/831 |
| 6,875,492 B1 * | 4/2005 | Pirzada et al. ............ 428/833.2 |
| 2002/0081461 A1 * | 6/2002 | Nishikawa et al. .......... 428/848 |

FOREIGN PATENT DOCUMENTS

| CN | 1360304 A | 7/2002 |
| EP | 0 339 813 A2 | 11/1989 |
| EP | 0 183 427 B1 | 1/1990 |
| EP | 0 468 778 A2 | 1/1992 |
| EP | 0 538 887 A1 | 4/1993 |
| JP | 3-142707 A | 6/1991 |
| JP | 04-001922 | 1/1992 |
| JP | 05-258291 | 10/1993 |
| JP | 06-139567 | 5/1994 |
| JP | 2002-288813 | 10/2002 |

OTHER PUBLICATIONS

Voevodin et al, Wear, vol. 203-204, © 1997, pp. 516-527.*
Translation JA 2000-348335 Hiroshi et al.*
Abstract JA 2000-348335—Published: Dec. 15, 2000.*
Chinese Office Action dated Sep. 29, 2006 for Appln. No. 200510074222.9.
Japanese Office Action dated Jan. 6, 2009 for Appln. No. 2004-183933.

* cited by examiner

*Primary Examiner*—Kevin M. Bernatz
*Assistant Examiner*—Louis Falasco
(74) *Attorney, Agent, or Firm*—Pillsbury Winthrop Shaw Pittman, LLP

(57) ABSTRACT

A magnetic recording medium is obtained by easily patterning a magnetic recording layer without deteriorating its electromagnetic conversion characteristics, by forming a silicon-based protective film between the magnetic recording layer and a photoresist, and performing dry etching and oxygen plasma processing.

4 Claims, 3 Drawing Sheets

MAGNETIC RECORDING MEDIUM, METHOD OF MANUFACTURING THE SAME, AND MAGNETIC RECORDING/REPRODUCTION APPARATUS

CROSS-REFERENCE TO RELATED APPLICATIONS

This application is based upon and claims the benefit of priority from prior Japanese Patent Application No. 2004-183933, filed Jun. 22, 2004, the entire contents of which are incorporated herein by reference.

BACKGROUND OF THE INVENTION

1. Field of the Invention

The present invention relates to a magnetic recording medium for use in, e.g., a hard disk apparatus using the magnetic recording technique and, more particularly, to a magnetic recording medium having a magnetic recording layer so patterned that magnetic structures such as adjacent tracks are physically separated, a method of manufacturing the same, and a magnetic recording/reproduction apparatus using the same.

2. Description of the Related Art

As the capacity of a magnetic recording apparatus increases, the track density of the apparatus also increases together with its linear bit density.

As described in, e.g., Jpn. Pat. Appln. KOKAI Publication No. 3-142707, a so-called patterned medium is a magnetic recording medium having, on its surface, an array of magnetic structures corresponding to 1 bit of recording information.

This patterned medium is attracting attention because mutual interference between bits can be reduced and ultra-high-density recording can be performed by forming the magnetic structures by using materials having different magnetic properties.

The magnetic recording layer of the patterned medium is generally patterned using the photolithography technique. For example, after a magnetic recording layer and carbon protective layer are formed on a substrate, a photoresist is formed by coating, and this photoresist is exposed and developed to form a photoresist pattern corresponding to the array of the magnetic structures described above. This photoresist pattern is used as a mask to etch the magnetic recording layer and carbon protective layer. After that, the photoresist pattern is removed by using oxygen plasma etching or the like, thereby obtaining a patterned magnetic recording layer.

When exposed to an oxygen plasma, however, the carbon protective layer is readily removed, and the surface of the magnetic recording layer is oxidized. This degrades the electromagnetic conversion characteristics of the magnetic recording layer.

BRIEF SUMMARY OF THE INVENTION

A magnetic recording medium of the present invention comprises a nonmagnetic substrate, a magnetic recording layer formed on the nonmagnetic substrate and patterned into a track shape or dot shape, and a silicon-based protective layer formed on at least a surface of the magnetic recording layer, which is opposite to the nonmagnetic substrate.

A magnetic recording/reproduction apparatus of the present invention comprises a magnetic recording medium including a nonmagnetic substrate, a magnetic recording layer formed on the nonmagnetic substrate and patterned into a track shape or dot shape, and a silicon-based protective layer formed on at least a surface of the magnetic recording layer, which is opposite to the nonmagnetic substrate, and a recording/reproduction head.

A magnetic recording medium manufacturing method of the present invention comprises sequentially forming a magnetic recording layer and silicon-based protective layer on a nonmagnetic substrate, forming a photoresist on the silicon-based protective layer, patterning the photoresist by a photolithography technique to form a photoresist pattern corresponding to a track shape or dot shape, partially removing the magnetic recording layer and silicon-based protective layer by dry etching by using the photoresist pattern as a mask, and removing the photoresist pattern by using oxygen plasma processing, thereby patterning the magnetic recording layer and silicon-based protective layer into a track shape or dot shape.

BRIEF DESCRIPTION OF THE SEVERAL VIEWS OF THE DRAWING

The accompanying drawings, which are incorporated in and constitute a part of the specification, illustrate embodiments of the invention and, together with the general description given above and the detailed description of the embodiments given below, serve to explain the principles of the invention.

DETAILED DESCRIPTION OF THE INVENTION

A magnetic recording medium of the present invention is a magnetic recording medium which includes a nonmagnetic substrate, and a magnetic recording layer formed on the nonmagnetic substrate and patterned into a track shape or dot shape, and which further has a silicon-based protective layer formed on at least a surface of the magnetic recording layer, which is opposite to the nonmagnetic substrate.

A magnetic recording/reproduction apparatus of the present invention is an example of an apparatus using the magnetic recording medium described above, and has the above magnetic recording medium and a recording/reproduction head.

A magnetic recording medium manufacturing method of the present invention is an example of a method of manufacturing the magnetic recording medium described above, and comprises forming a magnetic recording layer on a nonmagnetic substrate, forming a photoresist on the magnetic recording layer, patterning the photoresist by a photolithography technique to form a photoresist pattern corresponding to a track shape or dot shape, partially removing the magnetic recording layer by dry etching by using the photoresist pattern as a mask, and removing the photoresist pattern by using oxygen plasma processing, thereby patterning the magnetic recording layer into a track shape or dot shape, wherein a silicon-based protective layer is further formed on the magnetic recording layer before the photoresist is formed, and the photoresist is used as a mask to partially remove the magnetic recording layer together with the silicon-based protective layer by dry etching.

The track-shaped or dot-shaped pattern corresponds to the array of magnetic structures of a patterned medium. Examples of the track-shaped pattern are a spiral shape and concentric shape. In the magnetic recording layer thus formed into any of these patterns, adjacent tracks or dots are physically separated. In the magnetic recording medium of the present invention, recording tracks, tracking servo signals, address information signals, reproduction clock signals, and the like are written in the magnetic recording layer thus patterned.

Figure 1:
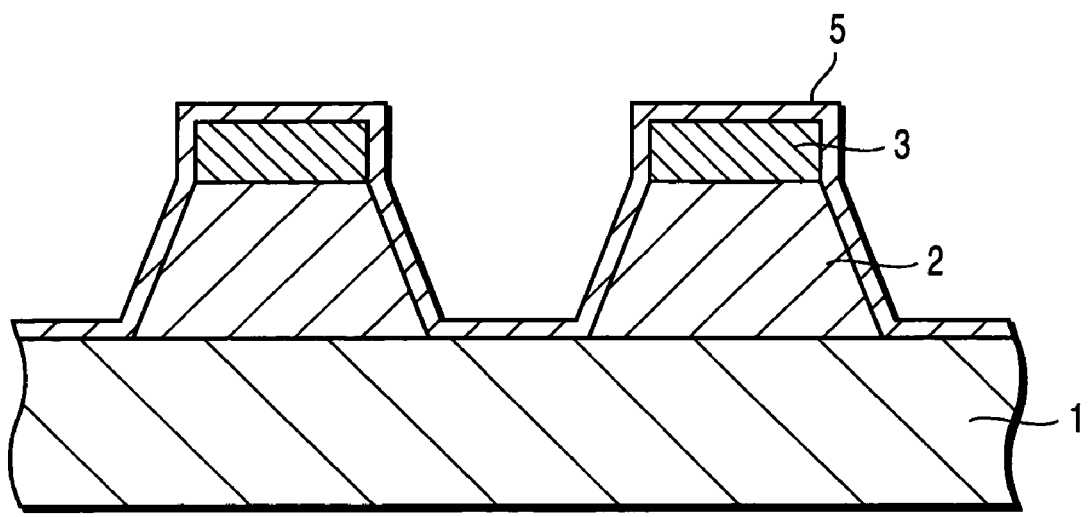
FIG. 1 is a sectional view showing the arrangement of an example of a magnetic recording medium according to the present invention.

FIG. 1 is a sectional view showing the arrangement of an example of the magnetic recording medium according to the present invention.

As shown in FIG. 1, the magnetic recording medium according to the present invention comprises a nonmagnetic substrate 1 having, e.g., a disk shape, a magnetic recording layer 2, a silicon protective layer 3, and a carbon-based protective layer 5. The magnetic recording layer 2 is patterned into a concentric or spiral track shape or a dot shape. The magnetic recording layer 2 has an upper surface which is opposite to a bottom surface in contact with the nonmagnetic substrate, and tapered side surfaces formed between the upper surface and bottom surface. The silicon protective layer 3 is stacked on the upper surface of the magnetic recording layer 2. The carbon-based protective layer 5 is continuously formed over the surfaces of the stacked bodies of the magnetic recording layer 2 and silicon protective layer 3, i.e., over the side surfaces of the magnetic recording layer 2, the surface of the silicon protective layer 3, and the surface of the nonmagnetic substrate 1 in a region except for the regions where the magnetic recording layer 2 is formed.

Note that this sectional view shows a portion of the section when the disk-like magnetic recording medium is cut perpendicularly to the two major surfaces along the radial direction of the medium.

In the present invention, a silicon-based protective layer is further formed between the magnetic recording layer and photoresist during the manufacture. After dry etching, those side surfaces of the magnetic recording layer, which are removed by etching are exposed, but at least the upper surface of the magnetic recording layer, which is opposite to the nonmagnetic substrate is covered with the silicon-based protective layer. If the magnetic recording layer is exposed to an oxygen plasma when the photoresist is removed, the exposed side surfaces are oxidized and are rendered nonmagnetic. If these side surfaces have magnetism and information is written in the side surfaces, the track width becomes larger than the actual track width, or recording magnetization becomes unstable to cause noise. However, the side surfaces of the patterned magnetic recording layer used in the present invention are rendered nonmagnetic. Therefore, the track width does not increase, and no noise is produced. On the other hand, the silicon-based protective layer protects the upper surface, and functions as a stopper against oxygen plasma etching. Accordingly, this upper surface does not oxidize, and good magnetism is maintained. In the present invention as described above, a magnetic recording medium having a patterned magnetic recording layer is obtained without deteriorating the electromagnetic conversion characteristics.

Also, the silicon-based protective layer can be formed by using an apparatus for forming the magnetic recording layer, e.g., a sputtering apparatus, merely by appropriately changing the target, conditions, and the like. This obviates the need for any special apparatus, equipment, and the like. In addition, the silicon-based protective layer can also be formed subsequently to the formation of the magnetic recording layer. This increases the mass-productivity. In the present invention as described above, a magnetic recording medium having a patterned magnetic recording layer is readily obtained at low cost without deteriorating the electromagnetic conversion characteristics.

To reduce the magnetic spacing, the thickness of the silicon-based protective layer is desirably as small as possible. However, to function as an etching stopper, this silicon-based protective layer is a continuous film in a certain aspect of the present invention. The silicon-based protective layer has a thickness of 5 to 15 Å. If the thickness is less than 5 Å, no uniform film is easily obtained, and this often deteriorates the effect of the anti-oxidation film or etching stopper. If the thickness exceeds 15 Å, the size of the magnetic spacing increases, and the electromagnetic conversion characteristics often degrade.

A carbon-based protective layer can be additionally formed on the magnetic recording layer surface and silicon-based protective layer surface. This carbon-based protective layer can be formed by, e.g., sputtering or plasma CVD after the photoresist is removed by oxygen plasma processing.

In a certain aspect of the present invention, the carbon-based protective layer has a thickness of 5 to 20 Å. If the thickness is less than 5 Å, no uniform film is easily obtained, and this often deteriorates the corrosion resistance and durability. If the thickness exceeds 20 Å, the size of the magnetic spacing increases, and the electromagnetic conversion characteristics often degrade.

Examples of a silicon-based material used in the silicon-based protective layer are amorphous nitrogen-doped silicon and amorphous silicon. In one aspect of the present invention, amorphous nitrogen-doped silicon can be used. When amorphous nitrogen-doped silicon is used, a thin high-density film can be formed, which increases the corrosion resistance.

The photoresist pattern can be formed by using, e.g., the photolithography technique or in-print technique. In a certain aspect of the present invention, the in-print technique can be used. The in-print technique has the advantage that patterning can be performed with high accuracy and high mass-productivity.

Also, ion milling or reactive ion etching (RIE) can be used as dry etching.

As the nonmagnetic substrate, it is possible to use, e.g., an NiP-plated aluminum substrate, glass substrate, and silicon single-crystal substrate.

As a magnetic recording method, the longitudinal magnetic recording method and perpendicular magnetic recording method can be used. As a longitudinal magnetic recording layer, it is possible to use, e.g., a CoCr alloy, CoCrPtTa alloy, or CoCrTaPtB alloy. As a perpendicular magnetic recording layer, it is possible to use, e.g., a CoCrPt-based alloy or CoPtCrO-based alloy.

An undercoating can also be formed between the magnetic recording layer and nonmagnetic substrate.

This undercoating can be appropriately selected in accordance with the material, desired characteristics, and the like of the magnetic recording layer. As the undercoating, it is possible to use, e.g., Cr, CrW, CrMo, NiP, NiAl, and TiCr.

When the perpendicular magnetic recording method is used, a soft magnetic backing layer, e.g., NiFe, CoZrNb, or CoFe, can be formed between the nonmagnetic substrate and magnetic recording layer.

Figure 2:
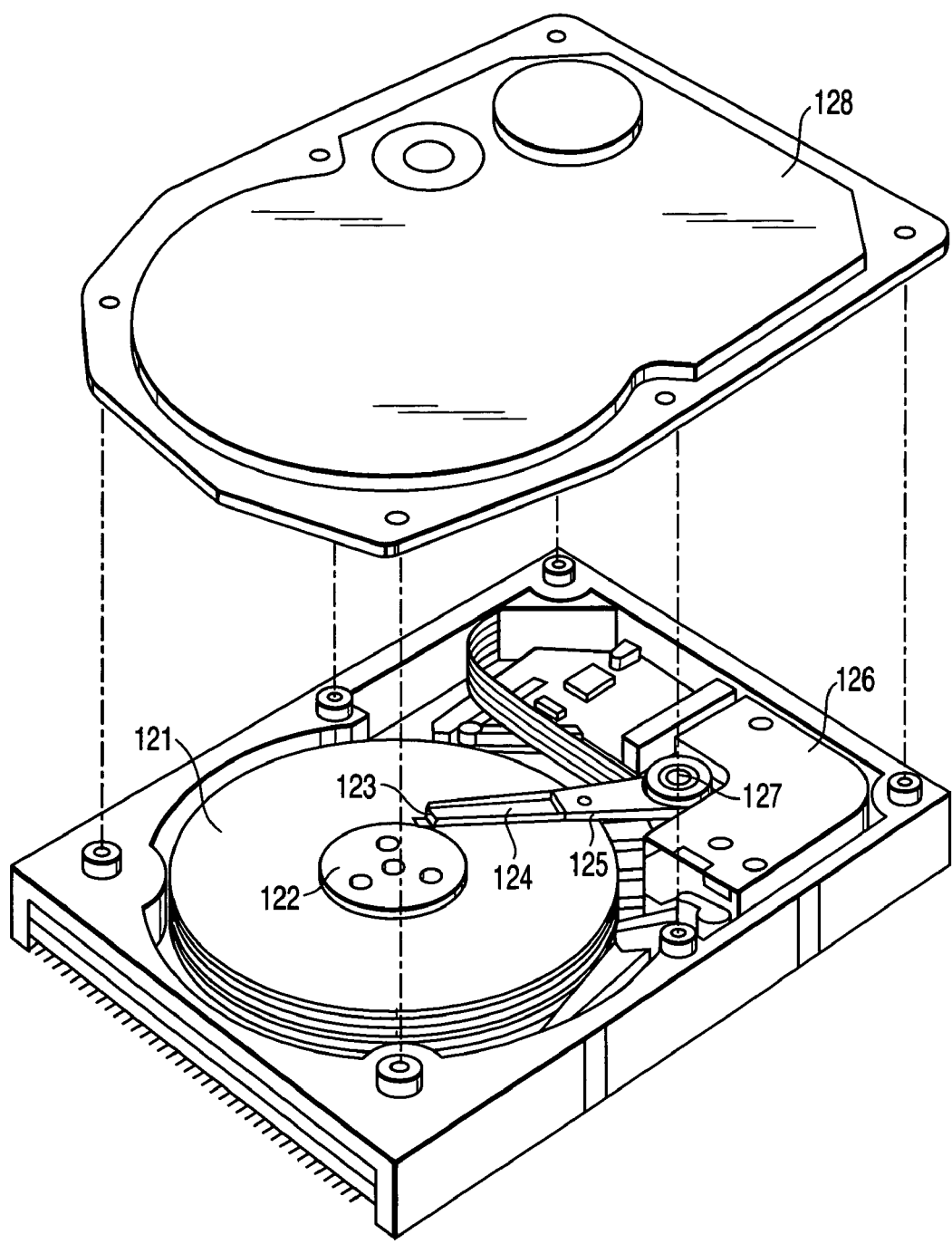
FIG. 2 is a schematic view showing the arrangement of an example of a magnetic recording/reproduction apparatus according to the present invention.

FIG. 2 is a partially exploded perspective view showing an example of the magnetic recording/reproduction apparatus of the present invention.

A rigid magnetic disk 121 for recording information according to the present invention is fitted on a spindle 122 and rotated at a predetermined rotational speed by a spindle motor (not shown). A slider 123 mounting a recording head for accessing the magnetic disk 121 to record information and an MR head for reproducing information is attached to the distal end of a suspension 124 which is a thin leaf spring. This suspension 124 is connected to one end of an arm 125 having, e.g., a bobbin which holds a driving coil (not shown).

A voice coil motor 126 as a kind of a linear motor is attached to the other end of the arm 125. This voice coil motor 126 includes the driving coil (not shown) wound around the bobbin of the arm 125, and a magnetic circuit having a permanent magnet and counter yoke opposing each other with the driving coil sandwiched between them.

The arm 125 is held by ball bearings (not shown) formed in two, upper and lower portions of a fixed shaft 127, and pivoted by the voice coil motor 126. That is, the position of the slider 123 on the magnetic disk 121 is controlled by the voice coil motor 126. Reference numeral 128 in FIG. 2 denotes a lid.

An embodiment of the present invention will be described in detail below.

FIGS. 3 to 7 are views for explaining the manufacturing process of the magnetic recording medium according to the present invention.

Referring to FIGS. 3 to 7, the patterned magnetic recording layer side surfaces are illustrated not as tapered surfaces but as surfaces perpendicular to the nonmagnetic substrate for the sake of convenience.

Figure 3:
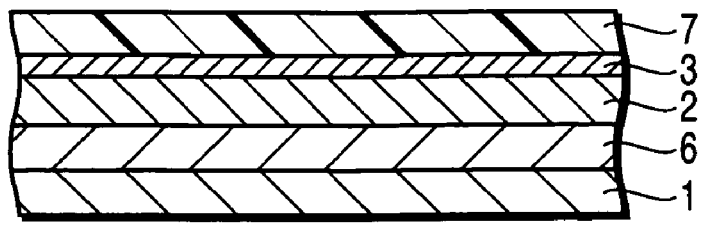
FIG. 3 is a sectional view for explaining a manufacturing process of the magnetic recording medium according to the present invention.

First, as shown in FIG. 3, a glass substrate 65 mm in diameter was used as a nonmagnetic substrate 1, and a 100-nm thick CoZrNb soft magnetic under layer 6 and 25-nm thick CoCrPt perpendicular magnetic recording layer 2 were formed by using DC magnetron sputtering at an Ar gas pressure of 2 mmTorr, an input power of 300 W, and a substrate temperature of 230° C.

On the surface of the CoCrPt perpendicular magnetic recording layer 2, a 2-nm thick amorphous silicon layer 3 was formed in an argon ambient by DC magnetron sputtering at an argon gas pressure of 5 mTorr and an input power of 250 W.

The amorphous silicon layer 3 was coated with a photoresist to obtain a photoresist coating layer 7.

Figure 4:
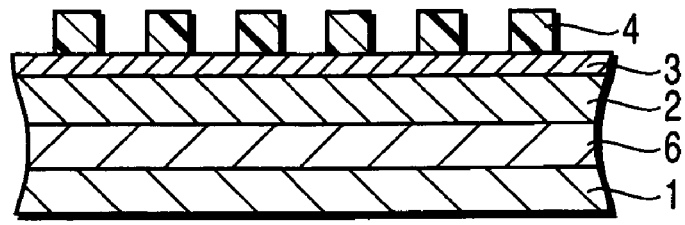
FIG. 4 is a sectional view for explaining a manufacturing process of the magnetic recording medium according to the present invention.

As shown in FIG. 4, the obtained photoresist coating layer 7 was exposed and developed by using a mask, thereby forming a desired photoresist pattern 4.

Figure 5:
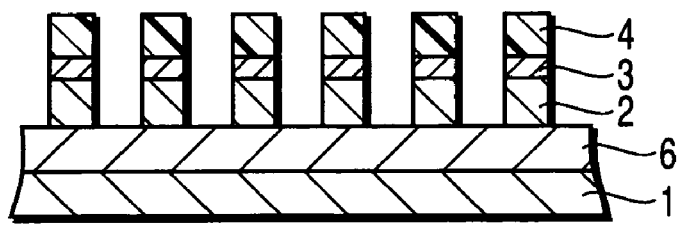
FIG. 5 is a sectional view for explaining a manufacturing process of the magnetic recording medium according to the present invention.

After that, as shown in FIG. 5, the photoresist pattern 4 was used as a mask to remove unnecessary portions of the magnetic recording layer, thereby obtaining a patterned magnetic recording layer 2.

Figure 6:
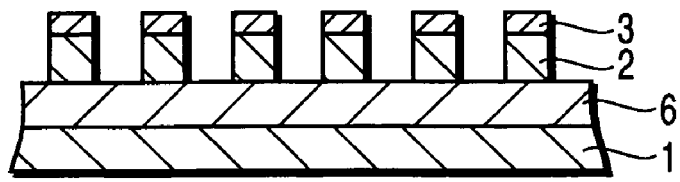
FIG. 6 is a sectional view for explaining a manufacturing process of the magnetic recording medium according to the present invention.

As shown in FIG. 6, the resist was removed by using an oxygen plasma. More specifically, the resist was removed by using an reactive ion etching (RIE) apparatus at an oxygen flow rate of 20 sccm, a total pressure of 30 mTorr, and an input RF power of 100 W. The end point of the etching was detected by emission analysis by using an end point monitor.

Since the silicon layer 3 was not removed by the oxygen plasma processing, it functioned as an ashing stop layer and also prevented oxidation of the surface of the magnetic recording layer.

Figure 7:
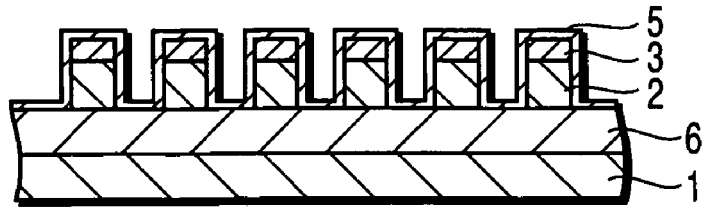
FIG. 7 is a sectional view for explaining a manufacturing process of the magnetic recording medium according to the present invention.

Subsequently, as shown in FIG. 7, a 2-nm thick amorphous hydrogen-added carbon layer 5 was formed by plasma CVD by using methane gas as a source gas at an RF power of 200 W, a bias voltage of −100 V, and a source gas pressure of 2 mTorr.

In addition, a 2-nm thick lubricating layer (not shown) made of a fluorine-based liquid lubricant was formed on the carbon layer 5 by dip coating, and annealing was performed at 100° C. for 30 min. Tape varnishing was performed after that, and a magnetic disk medium was obtained through an inspection step.

When the electromagnetic conversion characteristics of the obtained magnetic disk medium were checked, performances and results better than those of a non-patterned magnetic recording medium were obtained. The medium noise was also measured and found to be low.

In the manufacturing steps of the magnetic recording medium according to the present invention, oxidation of the magnetic layer surface can be prevented. Therefore, the quality of recording signals does not deteriorate. Also, the mass-productivity does not deteriorate because the silicon-based protective layer can be formed subsequently to the formation of the magnetic recording layer.

When the present invention is used as described above, a magnetic recording layer of a magnetic recording medium can be easily patterned without deteriorating the electromagnetic conversion characteristics of the layer. By the use of this magnetic recording medium, therefore, low-noise, high-recording-density recording/reproduction can be performed.

Additional advantages and modifications will readily occur to those skilled in the art. Therefore, the invention in its broader aspects is not limited to the specific details and representative embodiments shown and described herein. Accordingly, various modifications may be made without departing from the spirit and scope of the general inventive concept as defined by the appended claims and their equivalents.

What is claimed is:

1. A magnetic recording medium comprising:
   a nonmagnetic substrate;
   stacked bodies including a magnetic recording layer formed on the nonmagnetic substrate and a silicon based protective layer formed on the magnetic recording layer, and patterned into a track shape or dot shape; and
   a carbon based protective layer formed on said stacked bodies and the nonmagnetic substrate in at least one part of a region except for the regions where the magnetic recording layer is formed.

2. The medium according to claim 1, wherein the silicon-based protective layer has a thickness of 5 to 15 Å.

3. The medium according to claim 1, wherein the silicon-based protective layer is essentially made of amorphous nitrogen-doped silicon.

4. The medium according to claim 1, wherein the carbon-based protective layer has a thickness of 5 to 20 Å.

* * * * *